United States Patent [19]
Jung

[11] Patent Number: 6,114,442
[45] Date of Patent: Sep. 5, 2000

[54] CHEMICAL AND HEAT-RESISTANT STYRENE-BASED RESIN COMPOSITION

[75] Inventor: Soon-joon Jung, Ulsan-si, Rep. of Korea

[73] Assignee: Hyundai Motor Company, Seoul, Rep. of Korea

[21] Appl. No.: 09/143,030

[22] Filed: Aug. 28, 1998

[30] Foreign Application Priority Data

Aug. 30, 1997 [KR] Rep. of Korea ............... 97-44746

[51] Int. Cl.⁷ ................................. C08L 51/04
[52] U.S. Cl. ...................... 525/71; 525/64; 525/66; 525/78; 525/176; 525/230; 525/285
[58] Field of Search ..................... 525/71, 64, 66, 525/78, 176, 230, 285

[56] References Cited

U.S. PATENT DOCUMENTS 5,093,426  3/1992  Sakabe et al. ..................... 525/223
5,210,134  5/1993  Akkapeddi et al. ................. 525/645

*Primary Examiner*—James J. Seidleck
*Assistant Examiner*—Olga Asinovsky
*Attorney, Agent, or Firm*—Christie, Parker & Hale, LLP

[57] ABSTRACT

Disclosed is a chemical and heat-resistant styrene-based resin composition which uses the following as the primary resin: (A) a graft copolymer of a diene rubber component and at least two compounds selected from vinyl compounds, cyanide vinyl compounds, and maleic anhydrides; (B) a graft copolymer of an alkyl acrylate rubber component and at least two compounds selected from aromatic vinyl compounds, cyanide vinyl compounds, and maleic anhydride compounds; (C) a copolymer of styrene and a cyanide vinyl compound; (D) a copolymer of styrene, α-methylstyrene, and a cyanide vinyl compound; and (E) a copolymer of styrene, a cyanide vinyl compound, and a maleimide compound. An oil component, a lubricant, a thermal stabilizer, and an antioxidant are added at suitable ratios to the above primary resin.

6 Claims, No Drawings

CHEMICAL AND HEAT-RESISTANT STYRENE-BASED RESIN COMPOSITION

BACKGROUND OF THE INVENTION (a) Field of the Invention

The present invention relates to a chemical and heat-resistant styrene-based resin. More particularly, the present invention relates to a styrene-based resin composition that is resistant to chemicals including maleimide compounds, acrylate copolymers and oil elements, in addition to being resistant to heat, such that the resin composition can be used in a variety of automobile parts.

(b) Description of the Related Art

ABS (acrylonitrile-butadiene-styrene) and PC/ABS (polycarbonate/ABS) are most commonly used for interior parts of the automobile. However, when these materials come into direct contact with liquid-type aromatics, they weaken over time and become more prone to experience environmental stress cracks (ESCs). In addition, the application of substances often used in testing the chemical resistance of automobile parts such as brake oil, engine oil, gasoline, etc. discolor ABS and PC/ABS and crack areas on the materials where stress is concentrated. Accordingly, much research has gone into the development of a styrene-based composition used in vehicles that is resistant to ESCs and provides chemical resistance that is superior to that of ABS and PC/ABS.

In more detail, conventional chemical-resistant resin compositions are manufactured by increasing the content of acrylonitrile or the molecular weight of SAN (styrene-acrylonitrile) in ABS components. However, such adjustments rid or minimize some of the advantageous properties of the resin and complicate the manufacturing process. Accordingly, using such resin-based compositions in parts for vehicles becomes impractical, and even if these adjustments are implemented the chemical-resistance effects attained are minimal.

There is also a process in which a polyolefine-based resin is mixed with ABS to increase chemical resistance. A block Copolymer must be used with this composition to enable commercial use. However, in actual use, the polyolefine-based resin becomes separated in phase from the ABS, thereby greatly reducing the mechanical properties of the composition.

SUMMARY OF THE INVENTION

The present invention has been made in an effort to solve the above problems. It is an object of the present invention to provide a chemical and heat-resistant styrene-based resin composition such that the resin-based composition can be widely used in automobile parts.

To achieve the above object, the present invention provides a chemical and heat-resistant styren-based resin composition which uses the following as the primary resin: (A) a graft copolymer of a diene rubber component and at least two of a vinyl compound, cyanide vinyl compound, and a maleic anhydride; (B) a graft copolymer of an alkyl acrylate rubber component and at least two of an aromatic vinyl compound, a cyanide vinyl compound, and a maleic anhydride compound; (C) a copolymer of styrene and a cyanide vinyl compound; (D) a copolymer of styrene, α-methylstyrene, and a cyanide vinyl compound; and (E) a copolymer of styrene, a cyanide vinyl compound, and a maleimide compound. An oil component, a lubricant, a thermal stabilize, and an antioxidant are added at suitable ratios to the above primary resin.

According to a feature of the present invention, on the basis of the resin composition being 100 parts by weight, copolymer (A) is 10 to 50 parts by weight, copolymer (B) is 10 to 50 parts by weight, copolymer (C) is 10 to 30 parts by weight copolymer (D) is 10 to 50 parts by weight, and copolymer (E) is 10 to 50 parts by weight.

According to another feature of the present invention, the aromatic vinyl compound is selected from the group consisting of styrene, α-styrene, α-ethylstyrene, o-ethylstyrene, and ρ-ethylstyrene.

According to yet another feature of the present invention, the cyanide vinyl compound is selected from the group consisting of acrylonitrile, methacrylonitrile, and ethacrylonitrile.

According to still yet another feature of the present invention, the maleimide compound is selected from the group consisting N-phenylmaleimide, N-methylmaleimide, and cyclohexel maleimide.

According to still yet another feature of the present invention the oil component is selected from the group consisting of silicon oil and an ester-based oil, the silicon oil and the ester-based oil having a coefficient of viscosity of 1000 cs to 3,000,000 cs.

According to still yet another feature of the present invention, based on 100 parts by weight of the resin composition, 0.1 to 5 parts by weight of dimethyl polysiloxane oil is used for the silicon oil, or 0.1 to 5 parts by weight of dioctyl peralate oil is used for the ester-based oil.

DETAILED DESCRIPTION OF THE INVENTION

The present invention will now be described in detail.

The present invention provides a resin composition which replaces part of a heat-resistant ABS aromatic vinyl compound, comprising an α-methylstyrene compound, with a maleimide compound, uses an acrylate copolymer, and adds an oil component, thereby maximizing chemical-resistance.

In more detail the present invention provides a styrene-based resin composition which uses the following as the primary resin: (A) a graft copolymer, having a average molecular weight of 70,000 to 300,000, of a diene rubber component and at least two of an aromatic vinyl compound, cyanide vinyl compound, and a maleic anhydride; (B) a graft copolymer, having a average molecular weight of 70,000 to 300,000, of an alkyl acrylate rubber component and at least two of an aromatic vinyl compound, a cyanide vinyl compound, and a maleic anhydride compound; (C) a copolymer, having a average molecular weight of 50,000 to 300,000, of styrene and a cyanide vinyl compound; (D) a copolymer, having a average molecular weight of 50,000 to 300,000, of styrene, α-methylstyrene, and a cyanide vinyl compound, and (E) a copolymer, having a average molecular weight. of styrene, a cyanide vinyl compound, and a maleimide compound. Silicon oil, having a coefficient of viscosity of 1000 cs to 3,000,000 cs, or an ester-based oil is added to the resin composition, in addition to suitable amounts of a lubricant, a thermal stabilizer, and an antioxidant.

It is preferable to use styrene, α-styrene, α-ethlystyrene, o-ethylstyrene, and ρ-ethylstyrene for the above aromatic vinyl compound; acrylonitrile, methacrylonitrile, and ethacrylonitrile for the cyanide vinyl compound; and N-phenylmaleimide, N-methlymaleimide, and cyclohexel maleimide for the maleimide compound.

Copolymer (B) above has the following characteristics to provide high chemical resistance. With regard to the manufacture of copolymner (B), the properties and chemical resistance of the same are largely dependent on the method used to combine a rubber component core and a matrix component shell of copolymer (B). Here, the quantitative value exhibiting the level of joining between dispersed rubber particles and the matrix is referred to as the graft ratio. The graft ratio is most important factor in adjusting the properties of the resin, processability and chemical resistance, while the particle diameter of the rubber particles is also an important factor in adjusting the properties of the resin and processability. According to conventional methods, a multi-functional grafting material is used such that the graft ratio can be adjusted, and particle diameter is adjusted by post-agglutination or multiple-step polymerization. As a result, the process of adjusting the graft ratio is complicated and large amounts of costly grafting material must be used.

To solve this defect, the present invention adjusts both the size of the molecules and molecule size dispersion using the seed technique, and, at the same time, reduces the internal coefficient of viscosity of the rubber latex using swelling agent to adjust the properties and the graft ratio of the resin. The content of the acrylate rubber polymer (the content of the rubber) is 40 to 70 parts by weight; the content of the styrene-acrylonitrile copolymer, chemically combined with the rubber polymer, is 30 to 60 parts by weight; and the graft ratio is 30 to 50%. If the content of the above rubber polymer is less than 40 parts by weight, it lacks sufficient impact resistance, while if more than 70 parts by weight, the rubber polymer will have inadequate hardness.

Copolymer A is manufactured using the conventional emulsion polymerization method, and the content of a diene-based rubber polymer (rubber content) is 40 to 70 parts by weight; the content of the styrene-acrylonitrile copolymer, chemically combined with the rubber polymer, is 30 to 60 parts by weight; and the graft ratio is 30 to 50%.

On the basis of the resin composition of the present invention being 100 parts by weight, graft copolymer (A) is 10 to 50 parts by weight, preferably between 20 to 40 parts by weight; and graft copolymer (B) is 10 to 50 parts by weight, preferably 10 to 30 parts by weight.

If only copolymer (B) is used as reinforcement material against impacts, although chemical resistance can be highly enhanced, impact strength at low temperatures is greatly reduced. This is because the glass transition temperature of acrylate rubber is roughly −40° C., which is substantially higher than the −80 to −70° C. glass transition temperature of butadiene rubber, the butadiene rubber being the conventional ABS diene-based rubber. Accordingly, the low temperature characteristics of the acrylate rubber of copolymer (B) are sharply decreased. That is, low-temperature characteristics of automobile parts are tested at a range between −40° C. and −30° C. In this range, as acrylate rubber become brittle it is preferable that copolymer (B) is 30 or less parts by weight on the basis of the resin composition of the present invention being 100 parts by weight.

On the basis of the resin composition of the present invention being 100 parts by weight, copolymer (C) is 10 to 30 parts by weight, preferably 10 to 20 parts by weight. Here, if copolymer (C) exceeds 30 parts by weight, although processability is improved, heat resistance is reduced by the reduction in the content of heat-resistant SAN (styrene acrylonitrile) to an extent that application to automobile parts is impractical.

On the basis of the resin composition of the present invention being 100 parts by weight, copolymer (D) is 10 to 50 parts by weight, preferably 20 to 40 parts by weight; and copolymer (E) is 10 to 50 parts by weight, preferably 30 to 50 parts by weight.

The heat resistance of the resin composition according to the present invention is controlled by the ratios in which copolymers (D) and (E), which are used as heat-resistant SANs, are provided. Here, although heat and chemical resistance are enhanced in direct proportion to increases in the content of copolymer (E), the cost of copolymer (E) is restricting. Accordingly, the inventive resin composition uses a mixture of the less costly copolymer (D) with copolymer (E).

Further, to maximize the chemical resistance of the present invention, silicon oil or ester-based oil is added to the inventive resin composition. This oil component is provided on a surface or inside the inventive resin to decrease affinity to chemicals when contact is made with the same such that cracks occurring in areas of concentrated stress are prevented. In more detail, the present invention uses either dioctylphthalate (DOP), which is an ester-based oil using conventional PVC (polyvinyl chloride) as the plasticizer, or silicon oil, which improves not only processability and resistance to impacts, but also resistance to chemicals.

In particular, in the case of using the DOP, although chemical resistance is improved, as high temperatures are required when processing the heat-resistant ABS, the DOP undergoes thermal decomposition such that either gas is generated or thermal discoloration is accelerated, thereby diminishing the heat resisting properties of the present invention. Accordingly, with use of the DOP, the present invention is better used in areas where high heat resistance is not required. On the basis of the inventive resin composition being 100 parts by weight, the DOP is 0.1 to 3 parts by weight, preferably 1 to 2 parts by weight. Here, when more than 3 parts by weight of the DOP is used, both heat resistance and thermal stability are decreased.

In the case where silicon oil is used the same provides good thermal stability and processability, and is highly effective in improving resistance to impacts and chemicals. Dimethylpolysiloxane (DPS) is used as the silicon oil in the present invention at a coefficient of viscosity of 1,000 to 3,000,000 cs, preferably 10,000 to 1,000,000 cs. Here, if the coefficient of viscosity of the DPS is too low, surface migration easily occurs. Although this improves resistance to chemicals and increases gloss, resistance to heat and mechanical properties of the resin composition are reduced. On the hand, if the coefficient of viscosity of the DPS is high, although impact strength is improved, while the reduction in heat resistance and mechanical properties is minimal, only a small improvement in the resistance to chemicals is realized compared to when there is a low coefficient of viscosity. The DPS used in the present invention is the DC-200 series of DPS manufactured by Dow Corning, and is 0.1 to 5 parts by weight, preferably 1 to 2 parts by weight, based on 100 parts by weight of the resin composition.

The manufacture of the above copolymers used in the resin composition according to the present invention will be described hereinafter.

Manufacture of Copolymer A

Placed in a closed reactor were 2,000 g of butadiene; 2,000 g of ion-exchange water; 4 g of sodium lauryl sulfate; and 2 g of t-dodecyl mercaptan. These materials were then polymerized for 30 minutes to produce a polybutadiene latex. Next, 3,000 g of the produced polybutadiene latex, 3,000 g of ion-exchange water, 1.140 g of styrene, 360 g of acrylonitrile, 6 g of sodium lauryl sulfate, and 2 g of t-dodecyl mercaptan were placed in a new closed reactor. When the temperature reached 70° C., 2 g of persulfuric acid potassium were added, after which the mixture was polymerized for 3 hours to obtain a polymer having a average molecular weight of 150,000. This mixture was then made into a dry powder through post processing, thereby obtaining copolymer (A).

Manufacture of Copolymer B

For the first polymerization reaction, 4,000 g of ion-exchange water; 10 g of oleic acid sodium; 400 g of butyl acrylate; and 25 g of divinyl benzene were placed in a closed reactor. When the temperature in the reactor reached 80° C., 10 g of persulfuric acid potassium dissolved in water was added to the mixture, then the same was reacted for 30 minutes. Next, 435 g of butyl acrylate, 5 g of oleic acid sodium, 25 g of aryl methacrylate, and 15 g of divinyl benzene were placed in a mixer, and while being mixed, was injected in the reactor over a period of two hours. After this mixture underwent 1 hour of polymerization in the reactor, rubber latex having a molecular diameter of 0.5 µm was obtained.

Subsequently, for the second polymerization reaction, 2,000 g of the rubber latex obtained in the first polymerization reaction; 20 g of lauryl sulfuric sodium; 1,750 g of α-methylstyrene; 250 g of acrylonitrile; and 10 g of persulfuric acid sulfate were poured in a mixer. After obtaining a latex state, the mixture was pumped in the reactor over a period of two hours.

Finally, for the third polymerization reaction, 1,500 g of ion-exchange water, 20 g of lauryl sulfuric sodium, 25 g of t-dodecyl mercaptan, 350 g of α-methylstyrene, and 650 g of acrylonitrile were poured in a mixer and mixed until a latex state was obtained. Next, the mixture was poured in the reactor over a period of two hours, then after one hour, the reaction was discontinued. Accordingly, a polymer having a average molecular weight of 150,000 was obtained, and the polymer was made into a dry powder through post processing, thereby obtaining copolymer (B).

Manufacture of Copolymer C

Placed in a closed reactor were 4,000 g of ion-exchange water; 1,520 g of styrene; 480 g of acrylonitrile; 8 g of t-dodecyl mercaptan; and 10 g of sodium lauryl sulfate. After the temperature in the reactor was raised to 70° C., persulfuric acid potassium was added to the mixture. The mixture was then emulsion polymerized for a period of eight hours to obtain a copolymer having a average molecular weight of 150,000. Here, the copolymer SAN obtained was copolymer (C).

Manufacture of Copolymer D

Placed in a nitrogen substitution closed reactor was a mixed solution of 4,000 g of ion-exchange water; 60 g of alkylbenzene sulfonic acid sodium salt; 400 g of styrene; 150 g of acrylonitrile; 1,000 g of α-methylstyrene; 10 g of t-dodecyl mercaptan. As the temperature in the reactor was raised to 70° C., 10 g of persulfuric acid potassium were placed therein and the reaction was started. The temperature in the reactor was then slowly raised to 80° C. over a period of one hour.

Next, a mixed solution of 9,000 g of ion-exchange water; 100 g of alkylbenzene sulfonic acid sodium salt; 2,000 g of styrene; 1,000 g of acrylonitrile; 4,000 of α-methylstyrene; 10 g of t-dodecyl mercaptan; and 25 g of persulfuric acid potassium was poured in the reactor over a period of four hours. After completion of pouring, a mixed solution of 1,000 g of ion-exchange water; 10 g of alkylbenzene sulfonic acid sodium salt; and 5 g of persulfuric acid potassium was poured in the reactor. The mixture was then mixed for one hour to polymerize the same, thereby resulting in the attainment of a copolymer having a average molecular weight of 100,000. The copolymer SAN obtained was copolymer D.

Manufacture of Copolymer E

Placed in a nitrogen substitution closed reactor was a mixed solution of 4,000 g of ion-exchange water; 60 g of alkylbenzene sulfonic acid sodium salt; 800 g of styrene; 200 g of acrylonitrile; 500 g of N-phenylmateimide; and 10 g of t-dodecyl mercaptan. As the reactor was raised to 70° C., 10 g of persulfuric acid potassium was collectively placed in the reactor to start the reaction, after which the temperature of the mixture was slowly raised to 80° C. over a period of one hour.

Next, a mixed solution of 9,000 g of ion-exchange water; 100 g of alkylbenzene sulfonic acid sodium salt; 4,000 g of styrene; 1,500 g of acrylonitrile; 2,500 g of N-phenylmaleimide; 500 g of methacrylamide; 10 g of t-dodecyl mercaptan; and 25 g of persulfuric acid potassium was slowly poured into the reactor over a period of four hours. Subsequently, a mixed solution of 1,000 g of ion-exchange water; 10 g of alkylbenzene sulfonic acid sodium salt; and 5 g of persulfuric acid potassium was collectively poured in the reactor, then mixed for one hour to polymerize the same. Accordingly, a copolyrmer having a average molecular weight of 100,000 was obtained, the copolymer SAN being copolymer (E).

Preferred examples of the present invention will now be described in detail. As will be realized, the invention is capable of modification in various obvious respects, all without departing from the invention. Accordingly, the following description of the preferred examples is to be regarded as illustrative in nature, and not restrictive.

EXAMPLE 1

Placed in a Henzel mixer and thoroughly mixed was a mixture (see chart 1) of 50 parts by weight of an ABS copolymer (copolymer A); 20 parts by weight of a SAN copolymer (copolymer C); 30 parts by weight of an α-metlhlystyrene copolymer (copolymer D); 1.0 part by weight of ethylene bis-stearic acid amide, used as a lubricant; 0.5 parts by weight of diphenyl isooctyl phosphate, used as an antioxidant; and 0.5 parts by weight of magnesium oxide used as a thermal stabilizer. Next, the mixture was compressed using a compressor, thereby obtaining the resin composition of the present invention in the form of pellets.

Further to measure general properties and resistance to chemicals, the pellets were dried in a hot-air drier at 90° C. for two hours. Then using a 5-ounce injector, the samples (impact strength ¼", tensile strength ⅛", flexion strength ⅛", and thermal tension temperature ⅛") were injection molded, and the flexibility and chemical resistance were measured. At this time, the izode impact strength was measured using the ASTM D256 method, the tensile strength and the flexion strength were measured using the ASTM D790 method, the thermal tension temperature was measured using the ASTM D648 method, and the flexibility was measured using the ASTM D1238 method.

The resistance to chemicals was measured by manufacturing a test jig having a critical tension of 1.0%. and fixing a tensile strength sample on the jig. Next after applying a common spray-type aromatic, the jig and sample were placed in an oven, set at a temperature of 90° C., for 24 hours, after which the sample was observed for cracks. The critical tension was calculated using the formula 100×t/(t+

2×R), where t is the thickness of the sample (3.2 mm) and R is the radius of the test jig (160 mm).

EXAMPLE 2

Placed in a Henzel mixer and thoroughly mixed was a mixture (see chart 1) of 50 parts by weight of an ABS copolymer (copolymer A); 20 parts by weight of a SAN copolymer (copolymer C); 30 parts by weight of a phenylmaleimide-based heat-resistant SAN copolymer (copolymer E); 1.0 part by weight of ethylene bis-stearic acid amide, used as a lubricant; 0.5 parts by weight of diphieriyl isooctyl phosphate, used as an antioxidant; and 0.5 parts by weight of magnesium oxide, used as a thermal stabilizer. Next, the mixture was compressed using a compressor to obtain the resin composition of the present invention in the form of pellets.

The same method as that described in Example 1 was used to test general properties and chemical resistance.

EXAMPLE 3 to EXAMPLE 9

Copolymers A, B, C, D and E were provided in ratios as shown in Chart 1, and a lubricant, an antioxidant, and a thermal stabilizer were added to manufacture the polystyrene-based resin composition of the present invention. Further, the same method as that described in Example was used to test general properties and chemical resistance.

EXAMPLE 10

Placed in a Henzel mixer and thoroughly mixed was a mixture (see chart 1) of 20 part by weight of an ABS copolymer (copolymer A); 30 parts by weight of ASA copolymer (copolymer B); 10 parts by weight of a SAN copolymer (copolymer C); 10 parts by weight of an α-methlystyrene AMS-based heat-resistant SAN copolymer (copolymer D); 30 parts by weight of a phenylmaleimide (PMI)-based heat-resistant SAN copolymer (copolymer E); 0.5 parts by weight of DPS (10,000 cs); 1.0 part by weight of ethylene bis-stearic acid amide, used as a lubricant; 0.5 parts by weight of diphenyl isooctyl phosphate, used as an antioxidant; and 0.5 parts by weight of magnesium oxide, used as a thermal stabilizer. Next, the mixture was compressed using a compressor, thereby obtaining the resin composition of the present invention in the form of pellets.

The same method as that described in Example 1 was used to test general properties and chemical resistance.

EXAMPLE 11 to EXAMPLE 18

The ratios of the copolymers were identical to that of Example 10, and the content of silicon oil or DOP was adjusted as shown in Table 1. Further, the same method as that described in Example 1 was used to test general properties and chemical resistance.

TABLE 1a

| Elements | Example 1 | Example 2 | Example 3 | Example 4 | Example 5 | Example 6 |
|---|---|---|---|---|---|---|
| Copolymer A (ABS) | 50 | 50 | 50 | 60 | 40 | 50 |
| Copolymer B (ASA) | — | — | — | — | 10 | 20 |
| Copolymer C (SAN) | 20 | 20 | 20 | — | — | — |
| Copolymer D (AMS-based heat-resistant SAN) | 30 | — | 10 | — | — | — |
| Copolymer E (PMI-based heat-resistant SAN) | — | 30 | 20 | 50 | 50 | 50 |

TABLE 1a-continued

| Elements | Example 1 | Example 2 | Example 3 | Example 4 | Example 5 | Example 6 |
|---|---|---|---|---|---|---|
| Impact Strength (Notched 23° C. ¼') | 20.2 | 22 | 21.3 | 19.5 | 19.1 | 18 |
| Impact Strength (Notched −40° C. ¼') | 8.3 | 8.5 | 8.5 | 7.9 | 7.1 | 6.7 |
| Flexibility (220° C., 10 kg) | 7.5 | 6.2 | 6.5 | 3.3 | 3.1 | 3 |
| Thermal Tension Temp. (18.5 kg/cm², ¼") | 95 | 101 | 98 | 108 | 108 | 108 |
| Tensile Strength | 456 | 475 | 470 | 490 | 487 | 483 |
| Flexion Strength | 750 | 760 | 760 | 773 | 770 | 770 |
| Chemical Resistance | 5 | 4.5 | 4.5 | 4 | 3.5 | 3.5 |
| DPS 10,000 cs | — | — | — | — | — | — |
| DPS 100,000 cs | — | — | — | — | — | — |
| DOP | — | — | — | — | — | — |

TABLE 1b

| Elements | Example 7 | Example 8 | Example 9 | Example 10 | Example 11 | Example 12 |
|---|---|---|---|---|---|---|
| Copolymer A (ABS) | 20 | — | 20 | 20 | Ex. 10 | Ex. 10 |
| Copolymer B (ASA) | 30 | 50 | 30 | 30 | Ex. 10 | Ex. 10 |
| Copolymer C (SAN) | — | — | 10 | 10 | Ex. 10 | Ex. 10 |
| Copolymer D (AMS-based heat-resistant SAN) | — | — | 10 | 10 | Ex. 10 | Ex. 10 |
| Copolymer E (PMI-based heat-resistant SAN) | 50 | 50 | 30 | 30 | Ex. 10 | Ex. 10 |
| Impact Strength (Notched 23° C. ¼') | 18.6 | 17 | 19 | 19.7 | 21.4 | 23.2 |
| Impact Strength (Notched −40° C. ¼') | 6.2 | 3.6 | 6.5 | — | — | — |
| Flexibility (220° C., 10 kg) | 3 | 2.5 | 5 | 5.2 | 5.5 | 6.2 |
| Thermal Tension Temp. (18.5 kg/cm², ¼") | 107 | 107 | 104 | 104 | 103 | 101 |
| Tensile Strength | 475 | 466 | 470 | 460 | 456 | 430 |
| Flexion Strength | 768 | 760 | 766 | 760 | 750 | 743 |
| Chemical Resistance | 3 | 2 | 3 | 2.5 | 2 | 1 |
| DPS 10,000 cs | — | — | — | 0.5 | 1 | 2 |
| DPS 100,000 cs | — | — | — | — | — | — |
| DOP | — | — | — | — | — | — |

TABLE 1c

| Elements | Example 13 | Example 14 | Example 15 | Example 16 | Example 17 | Example 18 |
|---|---|---|---|---|---|---|
| Copolymer A (ABS) | Ex. 10 | Ex. 10 | Ex. 10 | Ex. 10 | Ex. 10 | Ex. 10 |
| Copolymer B (ASA) | Ex. 10 | Ex. 10 | Ex. 10 | Ex. 10 | Ex. 10 | Ex. 10 |
| Copolymer C (SAN) | Ex. 10 | Ex. 10 | Ex. 10 | Ex. 10 | Ex. 10 | Ex. 10 |
| Copolymer D (AMS-based heat-resistant SAN) | Ex. 10 | Ex. 10 | Ex. 10 | Ex. 10 | Ex. 10 | Ex. 10 |
| Copolymer E (PMI-based heat-resistant SAN) | Ex. 10 | Ex. 10 | Ex. 10 | Ex. 10 | Ex. 10 | Ex. 10 |
| Impact Strength (Notched 23° C. ¼') | 22 | 24.2 | 23.5 | 19 | 17.6 | 16.5 |
| Impact Strength (Notched −40° C. ¼') | — | — | — | — | — | — |
| Flexibility (220° C., 10 kg) | 5.4 | 6 | 6 | 5.7 | 7.2 | 8 |
| Thermal Tension Temp. (18.5 kg/cm², ¼") | 103 | 102 | 102 | 102 | 100 | 97 |
| Tensile Strength | 460 | 450 | 448 | 450 | 437 | 418 |

TABLE 1c-continued

| Elements | Example 13 | Example 14 | Example 15 | Example 16 | Example 17 | Example 18 |
|---|---|---|---|---|---|---|
| Flexion Strength | 753 | 750 | 747 | 730 | 712 | 678 |
| Chemical Resistance | 4 | 1.5 | 1.5 | 3 | 2.5 | 2 |
| DPS 10,000 cs | — | — | 1 | — | — | — |
| DPS 100,000 cs | 1 | 2 | 1 | — | — | — |
| DOP | — | — | — | 0.5 | 1 | 2 |

In Table 1, units indicating chemical resistance are defined as the following: 1 indicates no defects detected on the surface of the samples, 2 indicates slight cracks detected on corner portions of the samples, 3 indicates slight cracks detected on the surface of the samples, 4 indicates the detection of more substantial cracks on the surface of the samples, and 5 indicates that the samples experienced one or more cracks that went completely through the sample. Also, in the above examples, identical amounts of the lubricant (1 part by weight), antioxidant (0.5 parts by weight), and the thermal stabilizer (0.5 parts by weight) were used.

In the styrene-based resin composition according to the present invention, as chemical resistance and resistance to heat are fully provided to the resin composition, by the inclusion of a meleimide compound, acrylate copolymer and an oil component, application is possible to various automobile parts provided in areas that come into contact with aromatics, brake and engine oil, and gasoline, in addition to areas exposed to heat.

In this disclosure, there is shown and described only the preferred examples of the invention, but, as aforementioned, it is to be understood that the invention is capable of use in various other combinations and environments and is capable of changes or modification within the scope of the inventive concepts as expressed herein.

What is claimed is:

1. A styrene-based resin composition comprising a primary resin, an oil component, a lubricant, a thermal stabilizer, and an antioxidant, wherein the resin composition comprises at least two materials selected from the group consisting of:

(A) a graft copolymer, having an average molecular weight of 70,000 to 300,000, of a diene rubber component, an aromatic vinyl compound and at least one compound selected from the group consisting of cyanide vinyl compounds, and maleic anhydride compounds;

(B) a graft copolymer, having an average molecular weight of 70,000 to 300,000, of an alkyl acrylate rubber component and at least two compounds selected from the group consisting of aromatic vinyl compounds, cyanide vinyl compounds, and maleic anhydride compounds;

(C) a copolymer, having an average molecular weight of 50,000 to 300,000, of styrene and a cyanide vinyl compound;

(D) a copolymer, having an average molecular weight of 50,000 to 300,000, of styrene, α-methylstvrene, and a cyanide vinyl compound; and (E) a copolymer of styrene, a cyanide vinyl compound, and a maleimide compound, and wherein on the basis of the resin composition being 100 parts by weight, at least two of the copolymers selected from copolymers (A), (B), (C), (D), and (E), wherein copolymer (A), if present is in an amount of 10 to 50 parts by weight, wherein copolymer (B), if present is in an amount of 10 to 50 parts by weight, wherein copolymer (C), if present is in an amount of 10 to 30 parts by weight, wherein copolymer (D), if present is in an amount of 10 to 50 parts by weight, and wherein copolymer (E), if present is in an amount of 10 to 50 parts by weight.

2. The resin composition of claim 1 wherein the aromatic vinyl compound is selected from the group consisting of styrene, α-styrene, α-ethylstyrene, o-ethylstyrene, and ρ-ethylstyrene.

3. The resin composition of claim 1 wherein the cyanide vinyl compound is selected from the group consisting of acrylonitrile, methacrylonitrile, and ethacrylonitrile.

4. The resin composition of claim 1 wherein the maleimide compound is selected from the group consisting N-phenylmaleimide, N-methylmaleimide, and cyclohexyl maleimide.

5. The resin composition of claim 1 wherein the oil component is selected from the group consisting of silicon oils and ester-based oils, the silicon oils and the ester-based oils having a coefficient of viscosity of 1000 cs to 3,000,000 cs.

6. The resin composition of claim 5 wherein the composition comprises, based on 100 parts by weight of the resin composition, 0.1 to 5 parts by weight of dimethyl polysiloxane oil as the silicon oil, or 0.1 to 5 parts by weight of dioctylphthalate oil as the ester-based oil.

* * * * *